United States Patent [19]

Young

[11] Patent Number: 5,537,236
[45] Date of Patent: Jul. 16, 1996

[54] DISPLAY SYSTEM HAVING TWO LIQUID CRYSTAL LAYERS FOR DISPLAYING FIXED AND VARIABLE INDICIA

[75] Inventor: Robert W. Young, Somerset, England

[73] Assignee: Meggitt (UK) Limited, Dorset, United Kingdom

[21] Appl. No.: 245,015

[22] Filed: May 18, 1994

[30] Foreign Application Priority Data

May 18, 1993 [GB] United Kingdom ............... 9310190

[51] Int. Cl.$^6$ .................... G02F 1/1343; G02F 1/1335; G02F 1/1347
[52] U.S. Cl. ................................................. 359/87
[58] Field of Search ............................. 359/53, 63, 87, 359/89

[56] References Cited

U.S. PATENT DOCUMENTS

| | | |
|---|---|---|
| 3,512,028 | 5/1970 | McNaney . |
| 3,903,519 | 9/1975 | Zega ................................... 359/89 |
| 4,277,786 | 7/1981 | Waldron .............................. 359/89 |
| 4,449,123 | 5/1984 | Muranaga ........................... 359/87 |
| 4,641,923 | 2/1987 | Bohmer et al. ..................... 359/63 |
| 4,815,824 | 3/1989 | Sharples ............................. 359/89 |
| 4,952,036 | 8/1990 | Gulick et al. ...................... 359/53 |

FOREIGN PATENT DOCUMENTS

| | | |
|---|---|---|
| 0515298 | 5/1992 | European Pat. Off. . |
| 0153599 | 12/1979 | Japan ................................. 359/53 |
| 0076522 | 5/1982 | Japan ................................. 359/53 |
| 63-247728 | 10/1988 | Japan . |
| 1326399 | 11/1970 | United Kingdom . |
| 1330953 | 1/1971 | United Kingdom . |
| 1401928 | 11/1973 | United Kingdom . |
| 1515053 | 8/1976 | United Kingdom . |
| 2046494 | 1/1980 | United Kingdom . |
| 2062930 | 10/1980 | United Kingdom . |
| 2074356 | 3/1981 | United Kingdom . |
| 2090036 | 12/1981 | United Kingdom . |
| 2111284 | 11/1982 | United Kingdom . |

Primary Examiner—Anita Pellman Gross
Assistant Examiner—Tiep H. Nguyen
Attorney, Agent, or Firm—Price, Gess & Ubell

[57] ABSTRACT

A liquid crystal display system comprising a first display member overlying a second display member. Each member comprises two transparent layers (such as glass), coated with polariser and separated by a layer of liquid crystal. Each member has a set of individually actuable display elements. The display elements in the second member, and are visible through the first member.

10 Claims, 4 Drawing Sheets

DISPLAY SYSTEM HAVING TWO LIQUID CRYSTAL LAYERS FOR DISPLAYING FIXED AND VARIABLE INDICIA

FIELD OF THE INVENTION

The invention relates to a display system such as a liquid crystal display (LCD) system.

DESCRIPTION OF THE PRIOR ART

A typical display system is of the kind having a number of selectively actuable display elements which can be actuated individually to generate a number of different display patterns. Such systems are hereinafter referred to as of the kind described.

A problem which can arise in some circumstances in connection with display systems is where it is required that the display system has a very large number of individually actuable display elements. Each element needs to have its own actuating wire and the wires must be connected from the element to drive circuitry. This makes it very difficult to pack a large number of display elements into a small area.

GB-A-2046494 describes an LCD which provides analogue and digital readings which overlap each other and are still distinguishable on the same display. The display comprises a stack with a rear polariser, three glass layers with a liquid crystal layer between each of the two interfaces, and a front polariser.

The rear liquid crystal layer is actuated by electrodes to provide a digital display, and the front layer provides an analogue display.

The display must be manufactured as a single unit, and the analogue and digital layers cannot be manufactured or operated separately.

SUMMARY OF THE INVENTION

In accordance with the present invention, a display system comprises a first display member having a set of individually actuable display elements; and a second display member having a set of individually actuable display elements, the first member overlying the second member; wherein each member comprises two transparent layers separated by a liquid crystal layer, and each transparent layer is coated with a polarising layer, and wherein the elements of the second member are laterally offset from the display elements of the first member and are visible through the first member.

In this case, a large number of individually actuable display elements can be provided in a relatively small area by providing two display members one above the other with their respective display elements offset laterally.

For example, the display elements of the first member may be positioned in a peripheral region of the first display member, and the display elements of the second member may be positioned in a central region of the second display member.

The invention is particularly suitable where each display member comprises a liquid crystal display having a pair of parallel polarisers on either side of liquid crystal material, there being no polarisers in the region of the first display member overlying the display elements of the second display member.

In a typical embodiment of the invention, the first display member has a large number of densely packed individually actuable display elements arranged in a circle, which provide an analogue moving display. Typically, control means selectively and simultaneously actuates a block of adjacent display elements, and simulates movement of the block by actuating the next (leading) display element in the direction of movement and deactuating the trailing element while maintaining actuation of display element(s) between the leading and trailing display elements. These display elements can be positioned close together while a second member can provide display elements in a central region of the first member without the need for wires from the display elements in the central region having to be taken between adjacent display elements of the first member.

BRIEF DESCRIPTION OF THE INVENTION some examples of liquid crystal displays according to the invention will now be described and contrasted with known examples with reference to the accompanying drawings, in which.

EMBODIMENT

Figure 1:
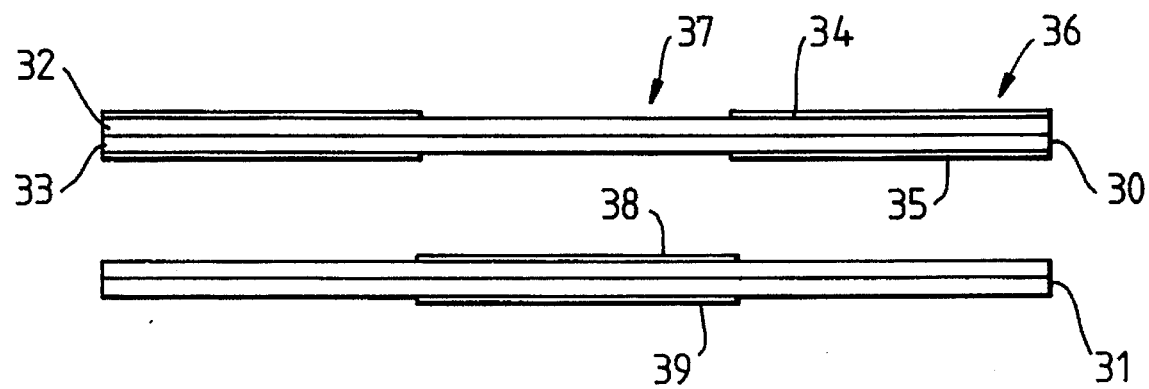
FIG. 1 is a schematic, exploded view of part of a display system according to the invention.

FIG. 1 illustrates an example of a display system according to the invention which, in this case, comprises a pair of liquid crystal display members 30,31. Each member 30,31 is of the polarising type. That is, each comprises a pair of glass sheets, for example sheets 32,33 between which is provided a micron thick layer of a liquid crystal material. The facing surfaces of the glass sheets 32,33 carry conductive plates shaped to conform to the display elements and wires connecting the plates to remote drive circuitry (not shown). Typically, the plates and wires will be etched onto the glass plates 32,33 using a conventional photoresist technique. The member 30 has on its upper and lower surfaces respective annular polarisers 34,35 which polarise light in parallel directions. The polarisers 34,35 are provided in a peripheral region 36 of the member 30 while a central region 37 is left uncovered so that the member 31 is viewable through the central region 37.

The central region of the member 31 carries parallel polarisers 38,39 but is otherwise of a similar construction to the member 30. The polarisers 38,39 may be at any chosen orientation with respect to the polarisers 34,35.

Each display member is normally black. This is because the liquid crystal layer in its normal state rotates the angle of polarisation of the light passing though it by 90°. When a voltage is applied between the conductive plates, the liquid crystal loses this quality, and the light passes through the display. This is classed as a negative display (i.e. white figures on a black background).

In use, the two members, 30,31 are sandwiched together and coupled to respective drive circuits which enable the display elements in the members 30,31 to be actuated.

FIGS. 2 to 6 show a second example of the invention as embodied in an LCD visual indicator. Numerals 30' to 39' in FIG. 2 indicate corresponding features to those shown at 30 to 39 in FIG. 1. In contrast to FIG. 1, the polarisers 38', 39' on the lower member have a small region of overlap 40 with the polarisers 34', 35' on the upper member. The lower polarisers are at 90° to the upper polarisers. The overlapping crossed polarisers 38' and 35' will produce a black ring (shown at 40 in the plan view shown in FIG. 3) around the inner circumference of the annular analogue display. This will be black at all viewing angles, and means that an observer will not be able to see through the display area 40 at an acute viewing angle.

The analogue display elements in the upper member are connected to PCBs (42,43,70,71) by flexible connectors (46,48,80,81). The digital display elements in the lower member are similarly connected to four PCB,s (41,44 and two not shown) by flexible connectors (45,47 and two not shown).

Figure 4:
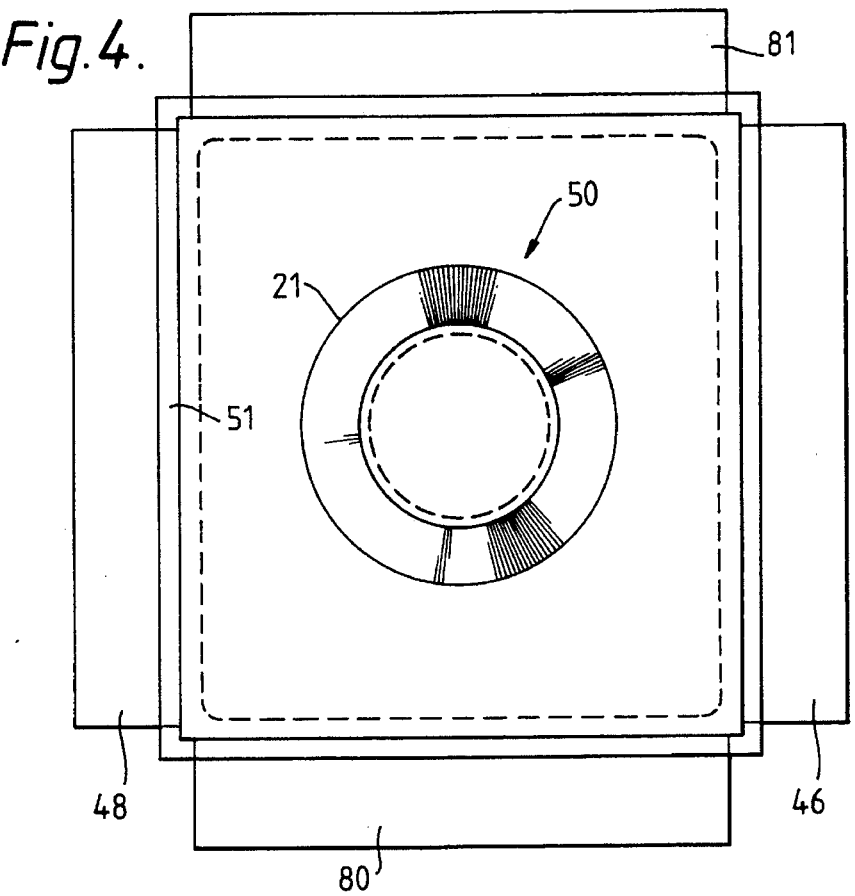
FIG. 4 is a plan view of the upper display member shown in FIG. 2.
Figure 5:
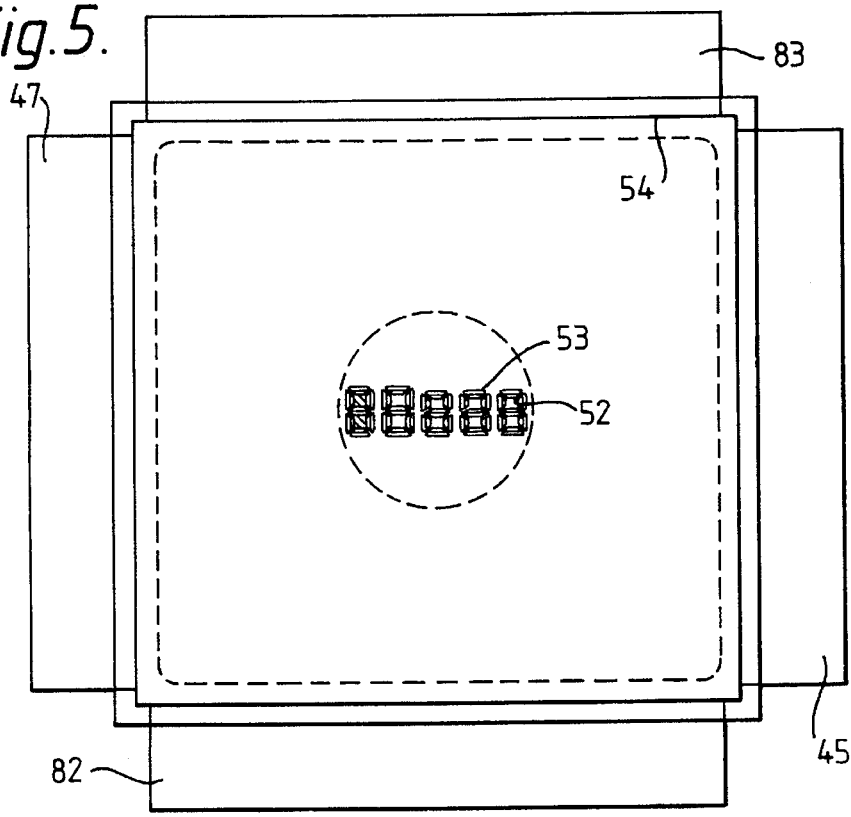
FIG. 5 is a plan view of the lower display member shown in FIG. 2.

FIG. 4 shows the upper display member. The upper member has a number of densely packed analogue display element electrodes 21, which are connected to PCBs by wires 1 in flexible connectors (46,48,80,81). FIG. 5 shows the lower display member, comprising a number of digital display element electrodes 52,53, connected by wires 54 and flexible connectors (45,47,82,83) to four PCB's (not shown). Each element of the digital display has two electrodes 52,53. This means that if one of the electrodes fails, the display will still show the correct number, and will not for instance display "0" instead of "8".

Figure 6:
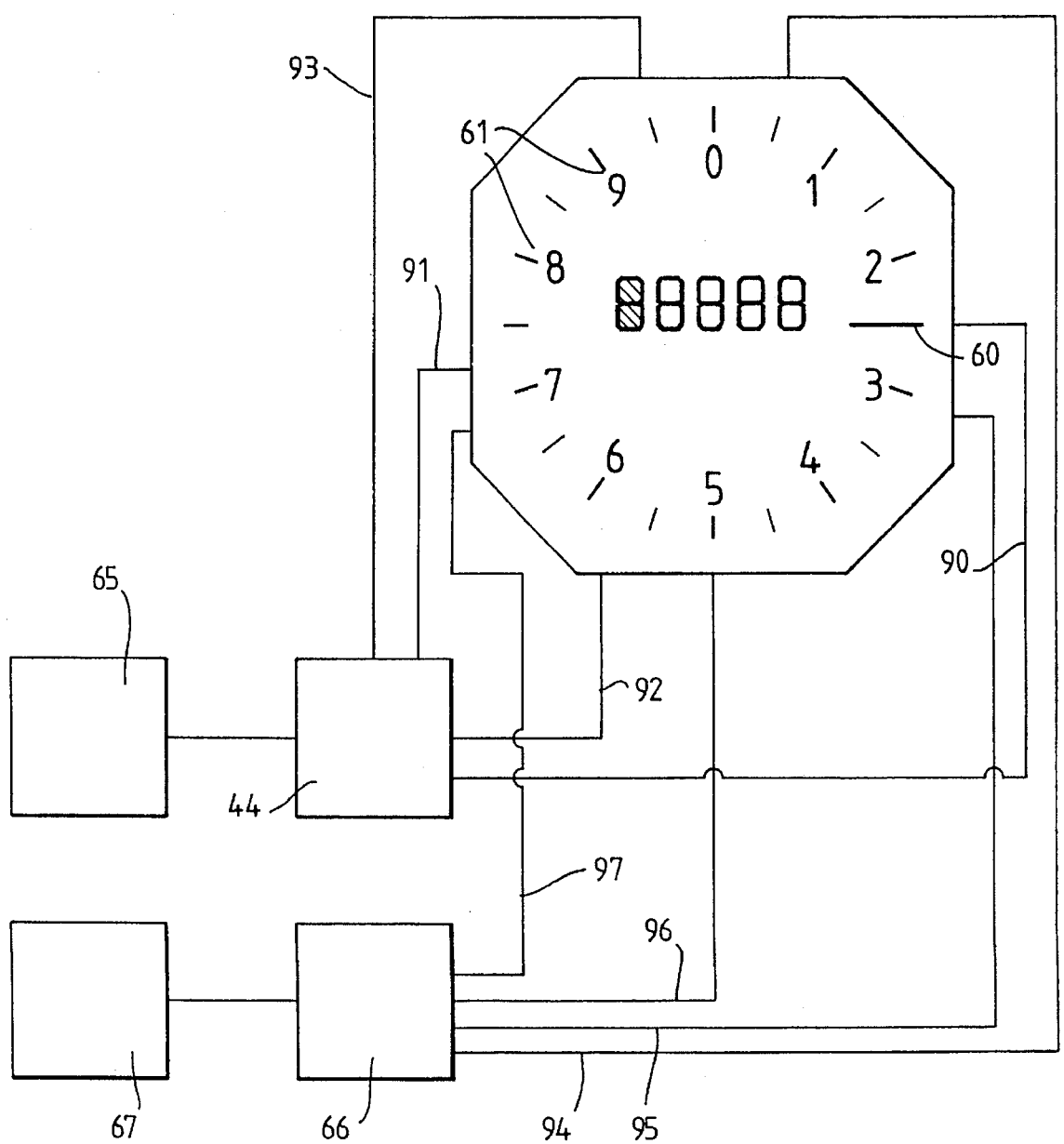
FIG. 6 illustrates the visual display provided by the two members shown in FIGS. 4 and 5; and, FIG. 7 illustrates part of the moving pointer display.

In combination, the two members provide a display as shown in FIG. 6. A block of adjacent electrodes 21 are activated to provide an analogue moving pointer 60 which points at fixed indicia 61. Typically, the fixed indicia are defined by the rear polariser, or are provided between the liquid crystal material and the rear polariser, as described in our commonly assigned US patent application of even date entitled "Improvements Relating to Liquid Crystal Displays". This provides an analogue display. Control unit 64 is connected to the four analogue display PCB's (42,43,70,71) (not shown) via wires 90–93. The control unit addresses the display electrodes in response to signals from detector 65. The central region 62 contains the digital display elements in the lower member which are visible through the upper member. The digital display element PCB's are connected to control unit 66 via wires (94–97), which actuates the display in response to a detector 67.

Figure 7:
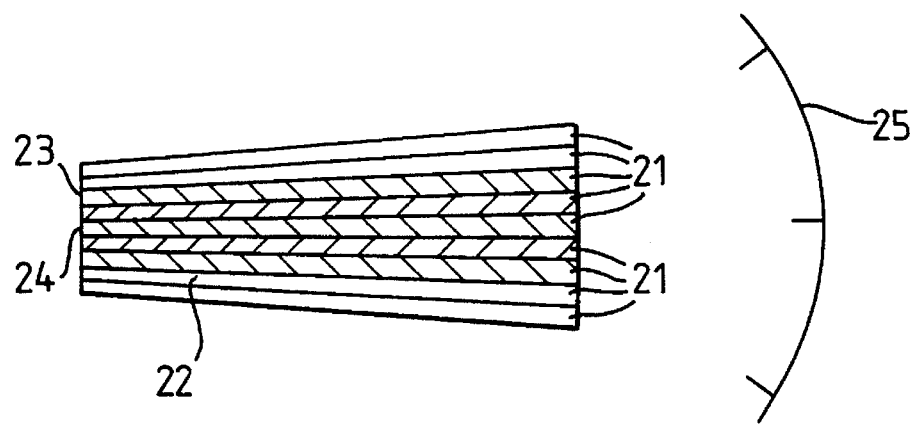
Figure 2:
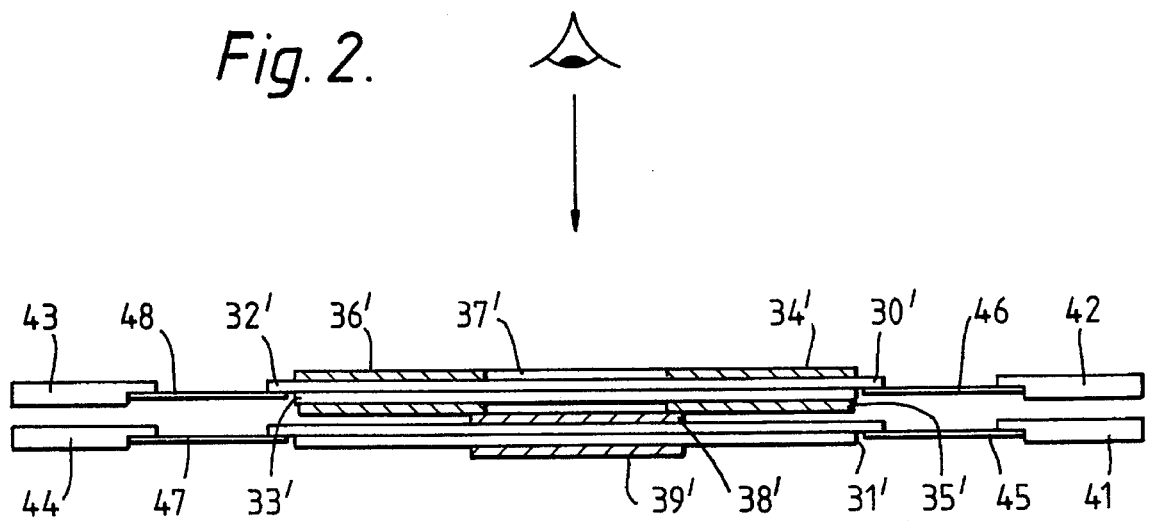
FIG. 2 is a similar view of part of a second example of a display system according to the invention.
Figure 3:
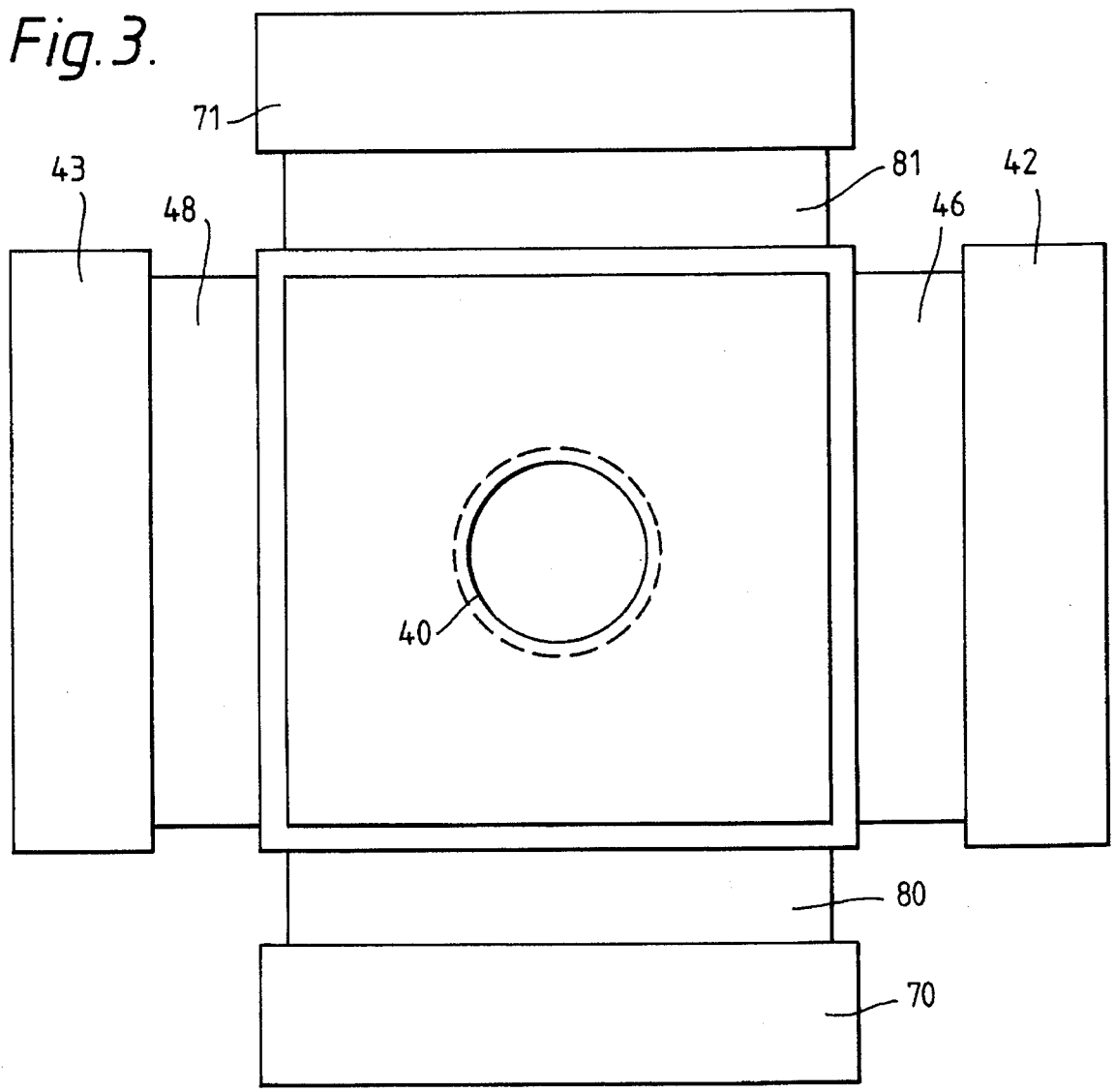
FIG. 3 is a plan view of the system shown in FIG. 2.

FIG. 7 illustrates part of the analogue display 50 shown in FIG. 4. A set of elongate, closely packed display elements 21 are provided extending fully around a circle (not shown). In use, the pointer defined by the actuated elements 21 can be moved clockwise, by actuating the next element 21 in the sequence (indicated at 22) and deactuating the trailing segment (indicated at 23). It will be noted that the four elements between the element 22 and the element 23 remain actuated during this process. The result gives the appearance of a smoothly moving pointer. The appearance of the pointer can be increased still further by deactuating the central element giving a central marker to replace the conventional point. In the case of FIG. 7, this would be the element indicated at 24. The moving pointer display is described in our commonly assigned US patent application of even date entitled "Display System".

I claim:

1. A display system comprising a first display member having a first set of individually actuable display elements; and a second display member having a second set of individually actuable display elements, said first display member overlying said second display member; wherein each display member comprises two transparent layers separated by a liquid crystal layer, and each of said transparent layers is coated with a polarising layer, wherein said display elements of the second display member are laterally offset from said display elements of the first display member and are visible through said first display member, and wherein respectively different laterally spaced portions of said first and second display members are not coated with a polarising layer.

2. A system according to claim 1, wherein said portion of each display member containing no polarising layer substantially corresponds to an area in the other layer with a polarising layer, whereby said display elements in each layer are visible through the other layer when actuated.

3. A system according to claim 1, wherein said two polarising layers of each display member polarise light in parallel directions.

4. A system according to claim 1, wherein said four polarising layers overlap in selected regions to provided fixed indicia.

5. A display system according to claim 1, wherein said display elements of the first display member are substantially identical and arranged side by side, said system further comprising control means for selectively and simultaneously actuating a selected block of adjacent display elements of said first set, and for simulating movement of said selected block by actuating the next (leading) display element of the selected block in the direction of movement and deactuating the trailing element of the selected block while maintaining actuation of display element(s) of the selected block between said leading and trailing display element.

6. A system according to claim 5, wherein said control means deactuates at least one central element of the block.

7. A system according to claim 5, wherein said block comprises an odd number of display elements.

8. A system according to claim 5, wherein said display elements are arranged partially or completely around a circular arc.

9. A system according to claim 5, further comprising indicia arranged alongside said display elements, the indicia defining values of a parameter.

10. A system according to claim 1, wherein said second display member further comprises a third set of display elements, said third set comprising a digital display.

* * * * *